Oct. 21, 1958  K. K. KENNEDY  2,856,868
METHOD AND APPARATUS FOR KNEADING
AND TWISTING BREAD DOUGH
Filed Sept. 14, 1956  4 Sheets-Sheet 1

INVENTOR
KENNETH K. KENNEDY
BY
ATTORNEY

Oct. 21, 1958  K. K. KENNEDY  2,856,868
METHOD AND APPARATUS FOR KNEADING
AND TWISTING BREAD DOUGH
Filed Sept. 14, 1956  4 Sheets-Sheet 2

INVENTOR
KENNETH K. KENNEDY
BY
ATTORNEY

INVENTOR
KENNETH K. KENNEDY
BY D. Robert Cowers
ATTORNEY

Oct. 21, 1958     K. K. KENNEDY     2,856,868
METHOD AND APPARATUS FOR KNEADING
AND TWISTING BREAD DOUGH

Filed Sept. 14, 1956     4 Sheets-Sheet 4

INVENTOR

KENNETH K. KENNEDY

BY Robert Cervera

ATTORNEY

United States Patent Office 2,856,868
Patented Oct. 21, 1958

2,856,868

METHOD AND APPARATUS FOR KNEADING AND TWISTING BREAD DOUGH

Kenneth K. Kennedy, Cumberland, Md.

Application September 14, 1956, Serial No. 609,932

14 Claims. (Cl. 107—8)

This invention relates to the method and apparatus for handling moldable plastic materials, and more particularly to an improved, simple, and efficient method and apparatus for kneading and twisting bread doughs.

In recent years bread-making has become a large scale commercial operation, the bread being produced in commercial bakeries which turn out approximately 40,000,000 loaves daily; using standardized ingredients and approved methods.

Commercially bread dough is mixed in two sections, the first of which is called a sponge composed of flour, water, yeast and yeast food. After this sponge is mixed it is put into a fermentation room where it is allowed to set for approximately four hours, and once the setting period is over the sponge is placed into a mixer and the balance of the ingredients are added; namely, flour, milk, lard, and the like.

The dough is thoroughly mixed and then passed down a chute into dividing machinery where the dough is scaled to the desired weight. The scaled dough then passes to a rounding machine where it is rounded into ball-like formations. The balls of dough are then deposited in travelling overhead proofers where the dough has an opportunity to regain some of the rising qualities of the yeast that were "stunned" in the course of the dividing and rounding processes.

The proofed dough passes to a molder which flattens the dough to pancake form, which is then rolled by a wire mesh on a conveyor belt into rolls of about one inch in diameter and twelve inches long. Two pieces of this dough are then twisted together to make a loaf of bread; this twisting being carried out by hand even in the largest of commercial bakeries. Once the two rolls have been twisted together the rolls are allowed to proof for about sixty minutes after which time the dough is transported to the baking ovens.

Molding, kneading, or twisting of the dough aids the development of the gluten, so that it becomes elastic, forming a network around the starch particles and holding the carbon dioxide formed by the yeast. Such twisting improves the quality and texture of the loaf of bread, and will result in an item of uniform texture which is an important selling point to the industry. However, since such twisting is presently carried out by hand labor the operation exorbitantly expensive for large commercial bakeries. As a result, many commercial bakers have eliminated or abandoned the twisting operation from their production, thereby sacrificing texture and quality in order to maintain cost at a minimum.

United States Letters Patents 518,942, issued to F. Duhrkop and 2,692,124, issued to F. C. Mendoza are illustrative of and disclose apparatus for the kneading and handling of dough-like materials. And, United States Letters Patent 1,790,347, issued to W. J. Hawkins, discloses machinery and/or methods for the production of bread dough, which represents a considerable advance in the art of bread making.

The present invention is directed to the method and apparatus for the manufacture of bread, and is particularly directed to the method and apparatus for mechanically molding and twisting bread dough to result in an end product having the quality and texture of hand-twisted doughs with no increase in the costs of production, and which in fact results in a lower cost of operation due to the elimination of heretofore necessary steps and costly equipment.

In accordance with the present invention the dough will be initially treated, as aforesaid, to intermix all the necessary ingredients. Once the dough has been properly mixed it will then be deposited onto a conveyor belt or into a chute to be transported to the novel molder-twister, which forms the apparatus of the present invention. The dough is kneaded downwardly through a container housing by means of a novel rotating worm-type feed. At the lower end of the container housing the thoroughly kneaded dough is extruded through a novel revolving extrusion head which rotates in a direction opposite to that of the worm-like feed. The extrusion head mounts a pair of downwardly converging orifices which extrude two elongate and separate pieces of dough. By means of the revolving extrusion head and a novel forming pan mounted thereunder the two pieces of extruded dough are intertwined or twisted together, an operation which heretofore was performed by expensive hand labor.

Once the dough has been extruded and twisted it is scaled to the desired weight and transported to the proofing room, after which it is baked.

It can be readily appreciated from the foregoing that by means of the present novel invention there is provided a means for inexpensively twisting bread dough in commercial bakeries, and in addition, the present novel invention will eliminate many steps in manufacture of the bread as well as eliminating such expensive machinery as, overhead proofers, rounders, molders, and the like.

It is therefore a primary object of the present invention to provide a novel method and apparatus for handling moldable material.

An additional object of the present invention is to provide an improved method for the kneading and mechanical twisting of bread doughs.

A further object of the present invention is to provide improved mechanical means for kneading and twisting multiple strands of bread dough to simulate hand-twisted bread doughs in texture and quality.

Another object of the present invention is to provide novel apparatus for mechanically kneading and twisting multiple strands of bread dough, which also eliminates expensive machinery, and simulates hand twisted bread doughs.

Still another object of the present invention is to provide a novel method and apparatus for progressively kneading bread doughs, revolvably extruding multiple strands of dough, and mechanically effecting twisting of said strands, whereby said twisting simulates hand twisted doughs in quality and texture.

Still an additional object of the present invention is to provide a novel method and apparatus for mechanically kneading and twisting multiple strands of bread dough that eliminates steps in the production of bread making, as well as complicated apparatus, and which results in a less expensive end product of much improved quality and texture.

These and other objects will become more apparent from the following detailed description when read in conjunction with the attached drawings, wherein.

Figure 3:
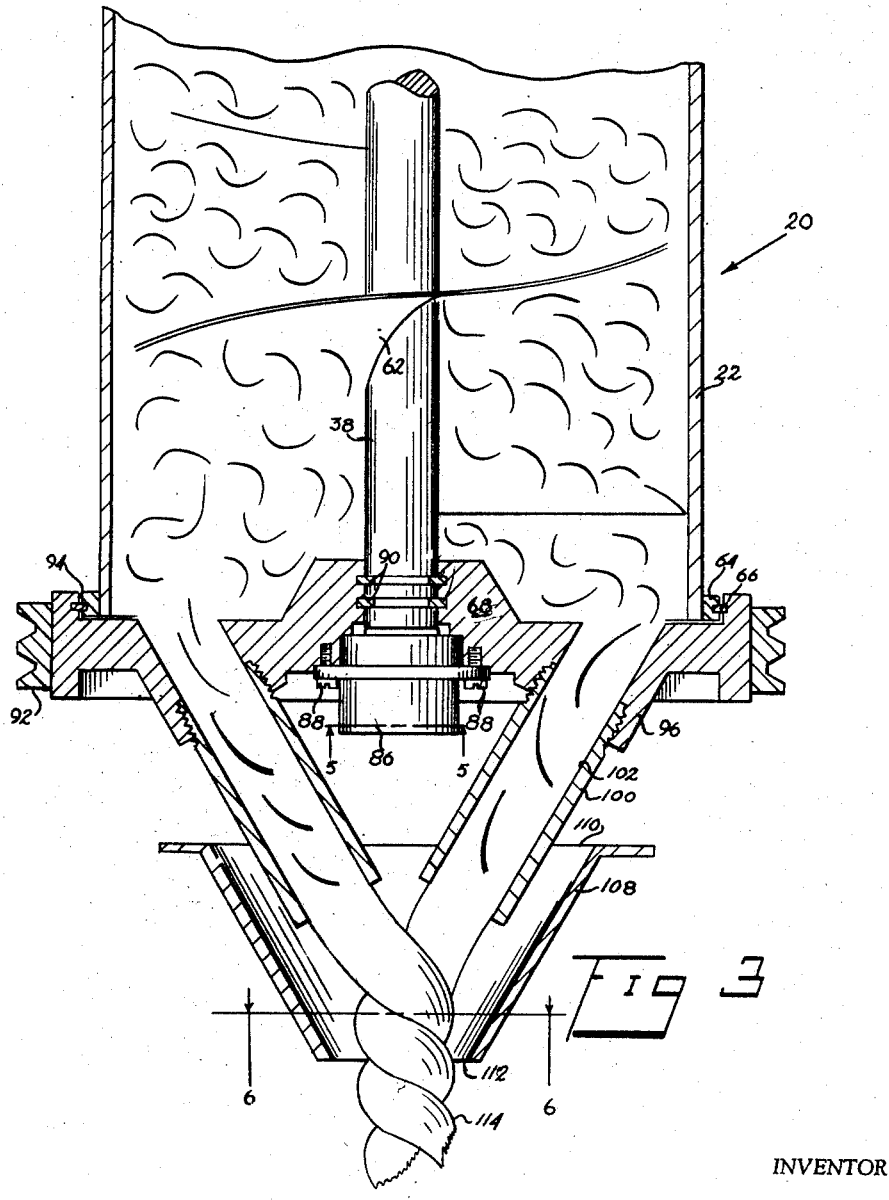
Figure 3 is a fragmentary vertical sectional view similar to that shown in Figure 2, but further showing the progress of dough through the apparatus and being discharged in multiple strands from said orifices and being twisted by the coaction of the rotatable extrusion head and forming pan.
Figure 4:
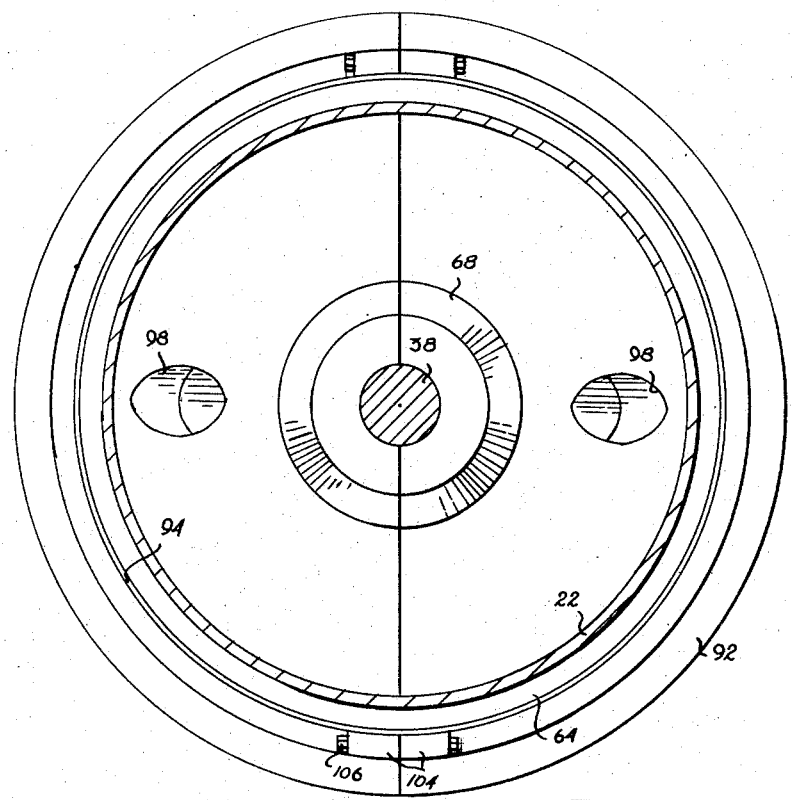
Figure 4 is a horizontal sectional view taken substantially along the line 4—4 of Figure 2, and showing further details of the rotatable extrusion head and discharge orifices.
Figure 6:
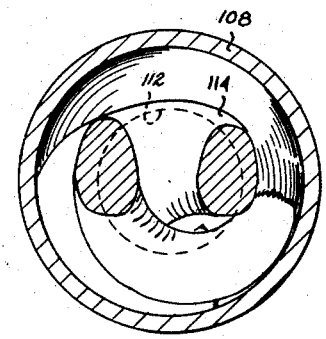
Figure 5:
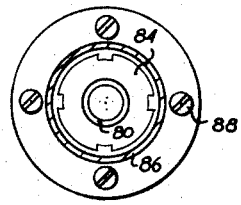

Figure 5 is a horizontal sectional view taken substantially along the line 5—5 of Figure 3, and showing further details of the rotatable shaft locking mechanism; and Figure 6 is a horizontal sectional view taken substantially along the line 6—6 of Figure 3, and showing the action of the extruded strands as they leave the orifices and are caused to intertwine or twist by the action of the rotatable extrusion head and conical forming pan.

Turning now to the drawings, the details of construction and function, unique mixing, kneading, extruding, and twisting mechanism of the present invention will now be particularly described.

Figure 1:
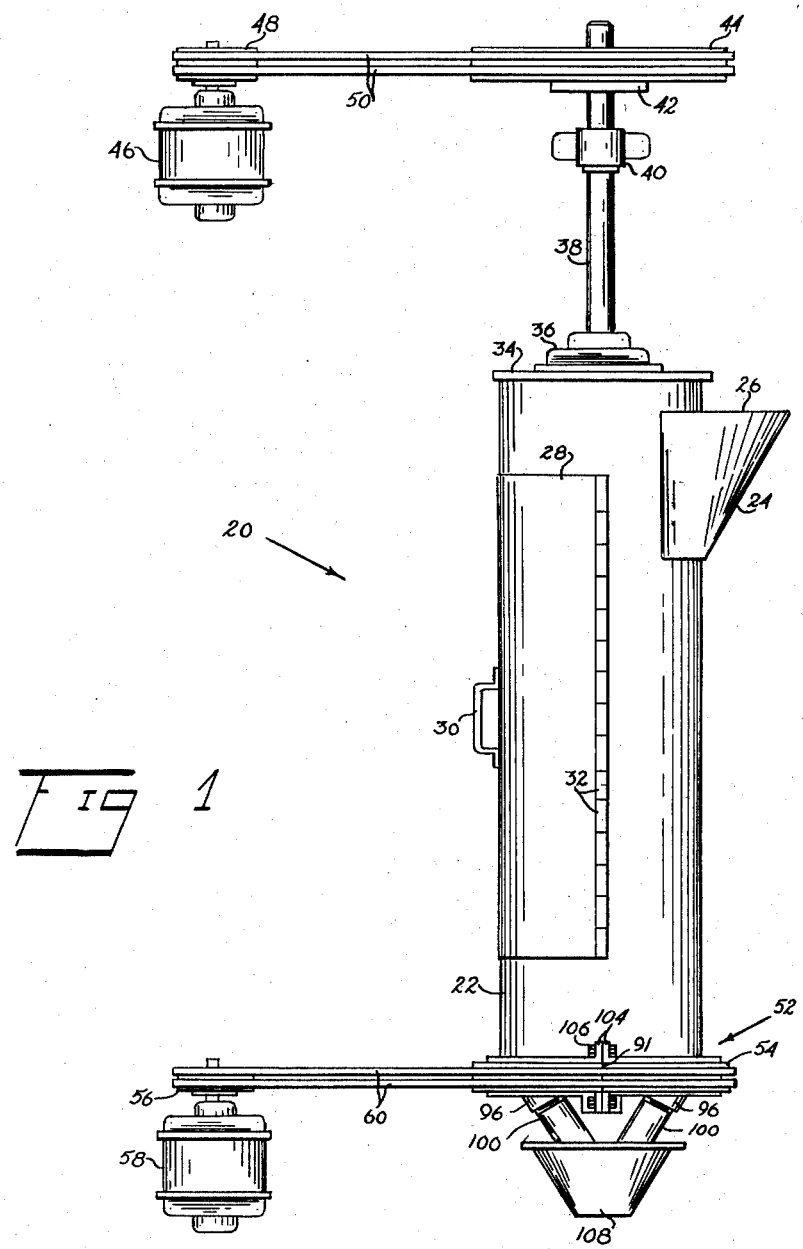
Figure 1 is an elevational view of the novel kneader-twister apparatus of the present invention, and showing the converging discharge orifices and forming pan and the multiple means for effecting feeding and extrusion of the bread dough.

With the apparatus and method of the present invention bread dough will be mixed in the conventional commercial manner heretofore described. After proper mixing and fermenting the bread dough goes through a supplemental mixing, as aforedescribed, and then transported to the mechanism illustrated in Figure 1, by means of suitable chutes or conveyor mechanisms (not shown).

Molder-twister, generally indicated by the numeral 20, comprises an elongate cylindrical housing 22 formed of suitable structural material; such as, stainless steel, which is internally plated with a non-toxic, non-adhesive, and chemically inert material, any number of which are commercially available. At the upper right-hand end of cylinder or housing 22, as viewed in Figure 1, there is an enlarged opening (not shown) encircled by a funnel-like chute or hopper 24, having an open upper end 26. Funnel or hopper 24 is suitably secured to housing 22, as by welding, soldering, or brazing, and is also, at least on its inner surfaces, plated with the aforedescribed plating material. At the left-hand side of housing 22, as viewed in Figure 1, there is an elongate arcuate or semi-cylindrical access door 28, having a handle 30. Door 28 is hingedly mounted on housing 22 as by hinges 32, and provides easy access to the interior of housing 22 for purposes of inspection, repair, or cleaning. Mounted on the upper end of cylindrical housing 22 is a cover member 34, threadedly connected to housing 22, or otherwise suitably fixedly connected thereto, which has fixedly secured thereto or integral therewith a bearing mounting boss 36, which serves to mount a roller bearing assembly (not shown) for rotatably mounting shaft 38.

Shaft 38, which extends through cylindrical housing 22 is rotatably supported by the bearing in boss 36, and is also further rotatably supported by bearing block assembly 40. As clearly seen in Figure 1, the upper end of rotatable shaft 38 fixedly mounts a pulley thrust plate 42, which bearingly supports a multiple sheave pulley 44, fixedly secured to and rotatable with shaft 38.

Electric motor 46 suitably fixedly mounted on a mounting member or stand (not shown) fixedly mounts a multiple sheave pulley 48, which is interconnected and/or drivingly connected with pulley 44 by means of multiple belts 50. Thus rotation of the motor shaft of motor 46, and consequently pulley 48, is transmitted to pulley 44 to effect rotation of shaft 38, for a purpose which will hereinafter appear.

The lower end of cylindrical housing 22 rotatably mounts an extrusion head assembly, generally designated 52, on which is fixedly secured a multiple sheave pulley 54, drivingly connected to drive pulley 56, fixedly mounted on the shaft of motor 58, by means of pulley belts 60. The details of novel rotatable extrusion head assembly 52 and the details of the internal mechanism of cylindrical housing 22 will now be particularly described with particular reference to Figures 2, 3, 4, 5 and 6.

Figure 2:
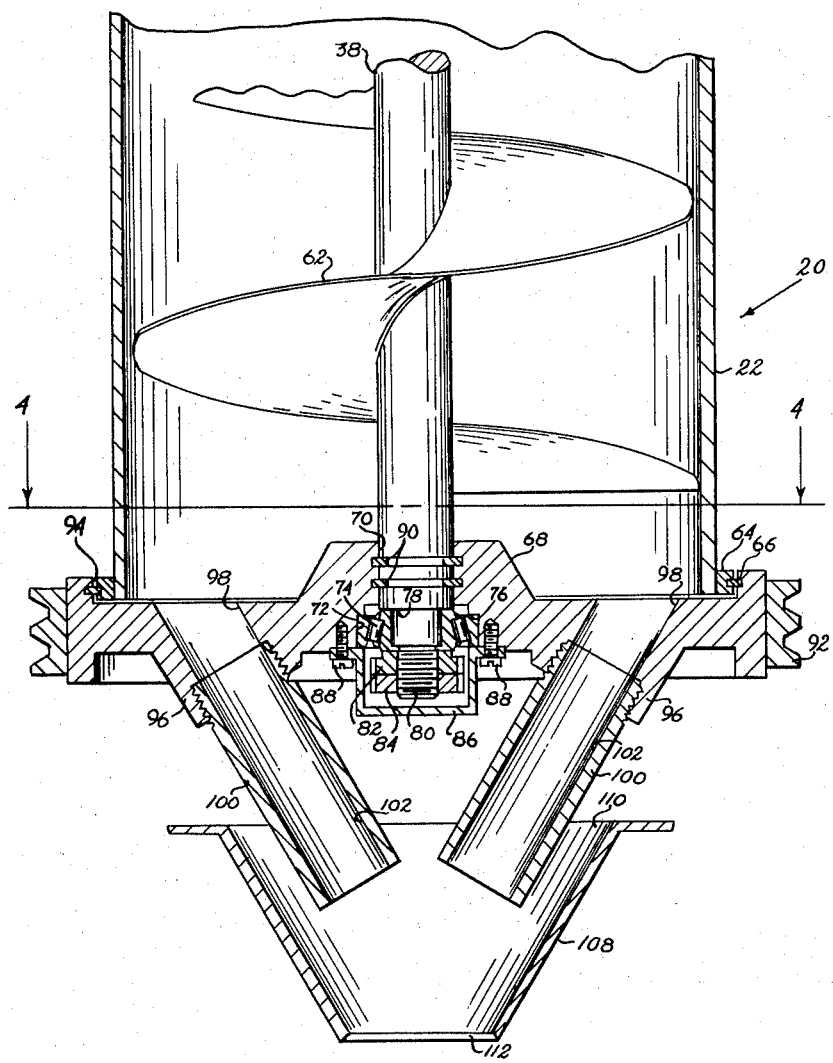
Figure 2 is a fragmentary vertical sectional view of the novel kneader-twister of the present invention, and showing the details of the rotatable feed mechanism and rotatable extrusion head, as well as further details of the novel converging discharge orifices and forming pan.

As clearly seen in Figure 2, rotatable shaft 38 extends through stationary housing 22, and fixedly mounts thereon a helical or spiral feed screw or blade 62. Blade or screw 62 is fixedly secured to shaft 38 by suitable means; such as, welding, brazing, or the like. Both rotatable shaft 38 and feed screw 62 are suitably plated with a non-toxic, non-adhesive, chemically inert substance, in order not to contaminate the dough being processed in housing 22.

As heretofore described, there is mounted at the lower end of stationary housing 22 a rotatable extrusion head assembly 52, which serves to twist the dough that has been kneaded by screw 62 and being extruded from housing 22, as will now become apparent. Annular ring 64 is fixedly mounted at the lower end of housing 22, as by means of a press fit, brazing, welding or the like, and is mounted flush with the lower end of housing 22, as clearly seen in Figures 1 through 3. The outer periphery of annular ring 64 is provided with a circumferential groove for purposes of mounting a sealing ring 66, as will hereinafter appear.

Rotatable extrusion head assembly 52 is formed in two semi-circular portions for purposes of ease of assembly, and has on its inner surface a truncated conical axially inwardly extending boss 68, through which extends axial bore 70. Axial bore 70 connects with, and is in axial alignment with, enlarged bearing mounting counterbore 72. Radial thrust bearing 74 is press fittedly mounted in counter-bore 72 with the inner face of its outer race in abutting contact with shoulder 76 of extrusion head assembly 52. The inner face of the inner race of thrust bearing 74 abuts shoulder 78 of shaft 38, as clearly seen in Figure 2. Threaded portion 80 of rotatable shaft 38 extends beyond thrust bearing 74 and serves to mount a pair of locking nuts 82 and 84, as also clearly seen in Figure 2, the purpose of which is to maintain the thrust bearing and shaft in fixed assembled relation.

Fixedly secured in overlying surrounding relation to the threaded end of shaft 38, nuts 82 and 84, and thrust bearing 74 is a hat-like cover member 86 secured to the underside of extrusion head assembly 52 by means of screws 88 threadedly mounted in suitable threaded openings in head assembly 52. Axial bore 70 is provided with a pair of axially spaced annular grooves which align with a similar pair of axially spaced annular grooves on shaft 38, and which cooperatively serve to mount spaced annular sealing rings 90, which prevent the passage of dough therebetween, or the admission of contaminating substances, upwardly, therebetween into housing 22.

In the course of assembly the annular sealing rings 90 are mounted on shaft 38 and the two halves of split extrusion head assembly 52 are then brought together into assembled relation. The bearing 74 is then press fittedly mounted on shaft 38 and into counter-bore 72, after which nuts 82 and 84, and cover plate 86 are secured in place. Mounted on the outer diameter of extrusion head 52 is a multiple grooved pulley or sheave 92. Sheave 92 like extrusion head 52 is split into two semicircles as indicated by line 91 at Figure 1. The two halves of sheave 92 are then welded or brazed to respective halves of head assembly 52 forming a unitary structure. As heretofore noted annular mounting ring 64 is provided with an external peripheral groove which aligns with an internal peripheral groove in counter-bore 94 of split extrusion head 52. Sealing member 68 is mounted in these aligned grooves to prevent the admission of dirt, or other contaminating substances through the space between annular ring 64 and split extrusion head 52.

It should be noted here that at least the inner face of head 52, and any and all other surfaces which might contact the dough being processed are plated with a non-toxic, non-adhesive, and chemically inert substance.

As clearly seen in Figure 2, split extrusion head 52 is provided with a pair of downwardly convergingly disposed bosses 96, having axially extending bores 98 therethrough, the lower ends of which are internally threaded to receive a pair of short pipe-like fittings 100, having internal bores 102 alignable with bores 98. Pipe-like fittings 100 are externally threaded at one end to threadedly fixedly engage bosses 96, as clearly seen in Figure 2. With pipe-like fittings 100 mounted in bosses 96, it will be clearly seen from Figure 2 that the two extensions 100 converge toward one another in close proximity. This converging relation contributes to the twisting of the dough as will appear.

Externally of housing 22, split extrusion head 52 is provided with axially extending bosses 104 which have threaded opening therethrough for mounting bolts 106 which fixedly secure the two halves of the head 52 and of course sheave 92 together.

As clearly seen in Figure 2, pipe-like extensions 100 extend downwardly into a stationary frustro-conical forming pan 108, which is provided with an open top 110 and an open bottom 112, respectively, the purposes of which will hereinafter be more particularly described in connection with the description of operation of the novel device herein disclosed.

It should be noted here that the motor 46 revolves shaft 38 in one direction, as for example clockwise, while motor 58 revolves the rotatable extrusion head assembly 52 in an opposite direction, as for example counter-clockwise, for a purpose which will hereinafter become apparent.

Once the sponge has been properly fermented and been fortified by added ingredients it is delivered to cylindrical housing 22 by means of a chute or conveyor (not shown) which directs the sponge mixture into the interior of housing 22 through open end 26 of funnel or hopper 24. The sponge delivered to housing 22 is subjected to a complete and constant kneading action by blade 62, which is rotating as for example in a clockwise direction. The rotation of blade 62 also serves to feed the dough along from the upper end of housing 22 to the lower end of housing 22 where it can be discharged through bores 98 and extensions 100. Thus the sponge delivered into the interior of housing 22, in addition to being kneaded, is progressively and continuously being fed downwardly through the housing by helical or spiral feed screw 62, in order to maintain a constant extrusion of dough.

It should be noted at this point that the diametrical clearance between the interior wall of housing 22 and feed screw 62 is maintained at an absolute minimum in order to prevent any dough from passing downwardly therebetween in an unkneaded condition, thus all the dough is kneaded by screw 62.

The sponge in housing 22 is progressively kneaded and fed along through the housing, and the elongate nature of housing 22 and screw 62 assures a thorough kneading of the dough. At the lower end of housing 22 the thoroughly kneaded dough passes outwardly through convergingly disposed extrusion openings 98 and 102 of contra-revolving head assembly 52.

As clearly seen from Figure 6 the two strands being extruded from housing 22 through pipe-like extensions 100 are caused to curl by the conical interior of forming pan 108 in cooperative action with the rotation of head assembly 52. This curling action of the strands and the converging or conical nature of forming pan 108 cause the strands to come together or twist together as the strands progress downwardly through pan 108, and through open bottom 112 thereof, the two strands exiting from pan 108 in a doubled or intertwined condition. And, the action of the two strands of dough in the forming pan together with the rotation of head assembly 52 very closely approximates or simulates hand action in twisting bread dough.

It will be readily appreciated from the foregoing that there is herein disclosed a unique method and apparatus for automatically and mechanically kneading and twisting bread dough, the twisting of which closely simulates the action of hand twisting bread dough, and which improves the quality over heretofore known commercially produced untwisted bread doughs.

The invention may be embodied in other forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. The method of making a bread of improved quality and texture which comprises, constantly mixing and feeding an unkneaded dough; convergingly downwardly ejecting multiple strands of mixed dough; simultaneously and uniformly moving said strands in progressively increasingly close proximity after ejection; and uniformly twisting said strands together to thereby improve the texture and quality of the dough.

2. The method of making a bread dough of improved quality and texture which comprises, continuously feeding an unkneaded dough mixture to a kneader; simultaneously kneading the dough in one direction and feeding the dough longitudinally through said kneader; convergingly downwardly ejecting multiple strands of dough from said kneader; simultaneously and uniformly effecting progressively increasing convergence of said strands after ejecting; and revolvably twisting said strands in an opposite direction thereby intertwisting said strands to improve the quality and texture of said dough.

3. The method of making a bread dough of improved quality and texture which comprises, continuously feeding an unkneaded dough mixture to a kneader; simultaneously revolvably kneading the dough in one direction and longitudinally feeding the dough through said kneader; downwardly ejecting the kneaded dough in substantially uniformly converging strands; causing said strands to curl into progressively and uniformly downwardly increasing close proximity after ejection; causing said ejected strands to be rotated in an opposite direction, whereby said curling and rotation of said strands effect complete uniform intertwisting of said strands; and continuously feeding said intertwisted strands away from said kneader.

4. A bread dough kneading and twisting device comprising: a receiving housing having an intake opening; means rotatably mounted in said housing revolvable in one direction for revolvably kneading and feeding dough longitudinally through said housing; extrusion means mounted at an end of said housing revolvable in an opposite direction; dual converging means on said extrusion means ejecting strands of dough therethrough in converging relation; and stationary curling means mounted beneath said converging means receiving said ejected strands of dough, whereby said curling means in cooperation with said revolvable extrusion means effect intertwisting of said strands to improve the quality and texture of said dough.

5. A bread dough kneading and twisting device comprising: a receiving housing having an intake opening adjacent an upper end thereof; spiral kneading means rotatably mounted in said housing, revolvable in one direction, for revolvably kneading and feeding dough through said housing toward the lower end thereof; extrusion means mounted at the lower end of said housing, revolvable in an opopsite direction to said kneading means, converging ejection means on said extrusion means at the lowermost end of said housing, whereby dough strands are ejected therefrom in uniform converging relation; stationary curling means having an axial opening therethrough mounted beneath and in close cooperative and partially surrounding relation to said ejection means, receiving dough strands ejected therefrom, whereby said curling means in cooperation with said revolvable extrusion means effect complete uniform intertwisting of said strands to improve the quality and texture of said dough; and drive means for oppositely rotating said kneading means and extrusion means.

6. A bread dough kneading and twisting device comprising: an elongate vertically disposed receiving housing having an intake opening at the upper end thereof; elongate kneading means coextensive with and rotatably mounted in said housing, revolvable in one direction, for revolvably kneading and feeding dough longitudinally through said housing; extrusion means mounted at the lower end of said housing, revolvable in an opposite direction to impart additional kneading by a shear action to the dough in said housing; converging hollow ejection means on said extrusion means, extruding dough strands therefrom in converging relation; stationary tubular curling means mounted beneath and in close cooperative relation to said ejection means receiving dough strands ejected therefrom, whereby said curling means in cooperation with said revolvable extrusion means effect complete intertwisting of said ejected strands to improve the quality and texture of said dough.

7. A bread dough kneading and twisting device comprising: an elongate hollow vertically disposed mixing housing having an intake opening at an upper end thereof; axially disposed spiral rotatable kneading means coextensively mounted in said housing; said kneading means revolvably moving dough in said housing in one direction and feeding the dough downwardly through said housing; an extrusion assembly mounted at the lowermost end of said housing and rotatable relative thereto in an opposite direction effecting an additional kneading to the dough by a shear action; stationary axially open forming means mounted in spaced cooperative relation beneath said extrusion means; converging hollow ejection means mounted on and rotatable with said extrusion assembly, extending downwardly therefrom in substantially close converging proximity, and substantially into said forming means, whereby dough strands ejected from said ejection means are thoroughly intertwisted by the cooperative action of said forming means and revolving extrusion assembly; drive means operatively connected to an upper end of said kneading means for rotating said kneading means in said one direction; and drive means operatively connected to said extrusion assembly for rotating said extrusion assembly in an opposite direction.

8. A bread dough kneading and twisting device comprising: a dough receiving housing; elongate feed means rotatably mounted in said housing for kneading and feeding dough longitudinally through said housing; substantially spaced angularly disposed ejection means oppositely rotatably mounted on an end of said housing in substantially close converging relation to receive and eject dough fed through said housing; and stationary forming means beneath and partially surrounding said revolvable ejection means cooperative therewith to uniformly intertwist strands of dough passing from said ejection means.

9. A bread dough kneading and twisting device comprising: a vertically disposed dough receiving housing; axially disposed feed means in said housing rotatable in one direction for feeding and kneading said dough axially therethrough; substantially angularly disposed hollow ejection means revolvably mounted on said housing and rotatable in an opposite direction to receive dough axially fed through said housing; and stationary hollow frustoconical forming means beneath and in partial surrounding relation to a portion of said ejection means, whereby dough ejected from said ejection means into said forming means is completely intertwisted by the cooperative action of said rotatable ejection means and forming means.

10. A bread dough kneading and twisting device comprising: an elongate vertically disposed cylindrical dough mixing housing having an intake opening adjacent an upper end thereof; a shaft rotatably mounted in said housing and axially coextensive therewith; progressive feed means substantially equal to the inner diameter of the cylindrical housing fixedly mounted on said shaft and rotatable therewith, for kneading and feeding dough through said housing to the lower end thereof; drive means operatively connected to said shaft for rotating said shaft in one direction; an extrusion assembly rotatably mounted on the lowermost end of said housing and shaft; drive means operatively connected to said extrusion assembly for rotating said extrusion assembly in an opposite direction to said shaft; substantially spaced angularly disposed hollow ejection means mounted in said extrusion assembly, and rotatable therewith, for extruding multiple strands of dough from said housing, extending beneath said housing in substantial converging relation having free ends thereof in close proximity; and a stationary tubular frustro-conical forming pan mounted beneath said housing in partial surrounding relation to a portion of said ejection means receiving strands of dough ejected therefrom, whereby said strands are completely intertwisted by the cooperative interaction of said conical forming pan and the revolvable extrusion assembly.

11. A bread dough kneading and twisting device comprising: an elongate vertically disposed mixing housing having an intake opening adjacent an upper end thereof; a funnel receiving hopper mounted on said housing in surrounding relation to said intake opening; a shaft rotatably mounted in said housing and axially coextensive therewith; a helical feed member fixedly mounted on said shaft and rotatable therewith, axially coextensive with said housing, for kneading and feeding dough therethrough; drive means operatively connected to said shaft for rotating said shaft in one direction; an extrusion assembly removably and rotatably mounted at the lowermost end of said housing and shaft having a pair of angularly disposed converging discharge openings; drive means operatively connected to said extrusion assembly for rotating said extrusion assembly in an opposite direction to said shaft; angularly disposed hollow ejection means removably mounted in said openings rotatable with said extrusion assembly for extruding multiple strands of dough; said ejection means extending beneath said extrusion assembly in progressively increasing converging relation, whereby free ends of said ejection means are in close proximity; and a stationary tubular frustro-conical forming pan mounted beneath said housing in partial surrounding relation to a portion of said ejection means receiving strands of ejected dough therefrom, whereby said strands are caused to curl and become completely intertwisted by the cooperative action of said conical forming pan and the revolvable extrusion assembly.

12. The device as set forth in claim 11 wherein said extrusion assembly comprises a pair of semi-circular members removably secured together.

13. The device as set forth in claim 12 wherein a multiple sheave is mounted on an outer periphery of said extrusion assembly, and drive belts interconnect said sheave and drive means.

14. The device as set forth in claim 13 wherein a multiple sheave is fixedly mounted on an upper end of said shaft, and drive belts drivably interconnect said sheave and drive means.

References Cited in the file of this patent

UNITED STATES PATENTS

| | | | |
|---|---|---|---|
| 559,323 | Drake | Apr. 28, | 1896 |
| 917,581 | Gerdes | Apr. 6, | 1909 |
| 1,142,893 | Laskey | June 15, | 1915 |
| 1,709,280 | Ost | Apr. 16, | 1929 |
| 1,714,234 | Ost | May 21, | 1929 |
| 2,026,667 | Braibanti | Jan. 7, | 1936 |